No. 881,411. PATENTED MAR. 10, 1908.
A. H. KINDER.
TIRE CASE.
APPLICATION FILED JULY 9, 1907.
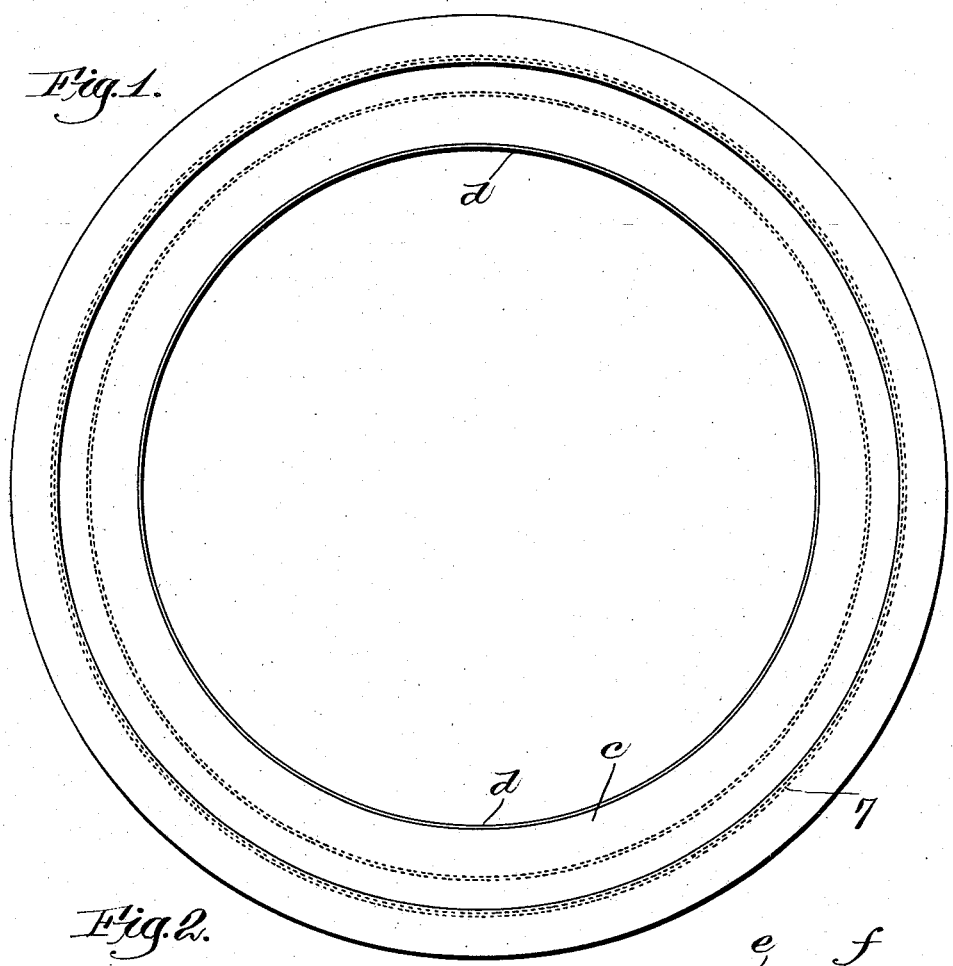
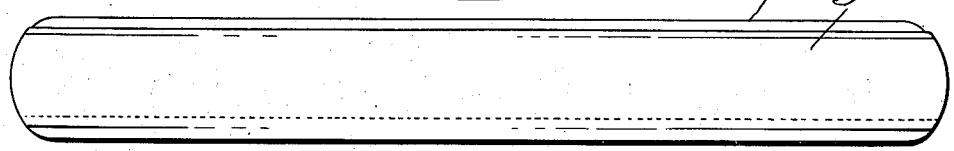
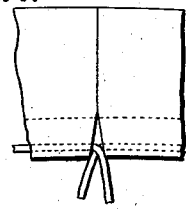
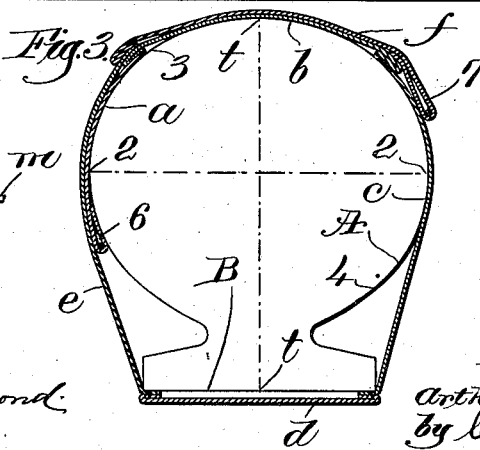
Witnesses.
Thomas J. Drummond.
Joseph M. Ward.
Inventor.
Arthur H. Kinder,
by Crosby Gregory attys.

UNITED STATES PATENT OFFICE.

ARTHUR H. KINDER, OF BOSTON, MASSACHUSETTS, ASSIGNOR TO FRANK B. HOPEWELL, OF NEWTON, MASSACHUSETTS.

TIRE-CASE.

No. 881,411.

Specification of Letters Patent.

Patented March 10, 1908.

Application filed July 9, 1907. Serial No. 382,949.

*To all whom it may concern:*

Be it known that I, ARTHUR H. KINDER, a citizen of the United States, and a resident of Boston, in the county of Suffolk and State of Massachusetts, have invented an Improvement in Tire-Cases, of which the following description, in connection with the accompanying drawing, is a specification, like letters on the drawing representing like parts.

This invention has for its object the production of a novel form of tire case for enveloping and protecting a spare tire, such as is used on automobiles. The tire case is of such width that it twice overlaps the tread face and one side of the spare tire, and it is held in place by cords located in pockets at the opposite edges of the case. One of these cords is, and preferably both are, longitudinally elastic. When expanded the edge of the edges containing the cord or cords can be snapped or stretched over the extreme diameter of the tire, and then held in place by the contraction of the cord or cords.

Figure 1 in side elevation represents a tire case embodying this invention containing a spare tire; Fig. 2 is a top plan view thereof; Fig. 3 is an enlarged transverse section of the tire case with the exterior outline of the tire section; Fig. 4 is a detail illustrating the ends of a non-elastic cord; Fig. 5 is a detail showing the preferable form of the elastic cords.

In the drawings, A represents the outline of a cross-section of a usual form of tire, having a flat base or holder at B. The tire case may be made of any suitable material, preferably waterproof or water repellent, and is shown as composed of several pieces, designated $a$, $b$, $c$, $d$, $e$, $f$, united to form a strip of the proper length according to the circumference of the tread of the tire A, and of a width sufficient to inclose the tire and overlap twice the tread face and one side thereof. Each longitudinal edge of the strip is formed with a pocket to contain the cord. These pockets 6 and 7 are formed by turning over the edges of the pieces of material $a$ and $f$ in the form of hems.

In the preferred form of tire case embodying this invention both of the two pockets 6 and 7 are provided with longitudinally elastic cords which may be made of any suitable material. Strong rubber elastic cord may be used, but for the preferred form a coiled metallic spring, a section of which is illustrated in Fig. 5, is used to constitute the cord. The ends of both cords are fastened together to form a circle, which in the normal or contracted state of the cord is of such a size to hold the tire case in place and prevent it from coming off from the tire until it is removed by force. If desired one of the pockets 6 and 7, and preferably the pocket 6, may be provided with a non-elastic cord, indicated at $m$ in Fig. 4, the ends of which cord may be drawn together and tied to hold the edge of the tire case in proper position.

When the tire case is of the preferred form with longitudinally elastic cords in both pockets, the tire case is applied in position by laying the parts $a$, $b$, $c$ on the tread face of the tire A, carrying the edge of the case having the pocket 6 down along the side 3 of the tire to a point below the line indicating the greatest diameter of the tire, such greatest diameter being indicated by the line 2—2. In this position the longitudinally elastic cord will be arranged of such a length as to be contracted and to hold the edge of the tire case having the pocket 6 by the contraction of the cord therein below the line of the greatest diameter of the tire. The tire case is then drawn down over the side 4 of the tire, through the central opening of the tire, around the usual base or holder B, if employed, upwardly over the side 3, and over the parts $a$ and $b$ of the case which overlap the tread face of the tire, and the edge of the case having the pocket 7 provided with the second longitudinally elastic cord is carried sufficiently far beyond the line $t$—$t$ indicating the greatest depth of the tire, to leave the cord below the highest point of the depth of the tire at its tread face, and between said point and the side 4 of the tire. The longitudinally elastic cord will be expanded over the greatest diameter of the tire as it passes into place and when the cord has reached the position shown in Fig. 3 the contraction thereof will hold the pocket and the edge of the tire case firmly and snugly in position, as shown. It will thus be seen that by the use of the longitudinally elastic cords the tire case may be placed in position and removed with ease and alacrity, and will be held firmly and snugly in position.

Having described my invention, what I claim as new and desire to secure by Letters Patent, is:

1. A tire case composed of material having at each edge a longitudinal pocket, a longitudinally elastic cord in each pocket by means of which when the case is in position on the tire the edges of the case are contracted into and retained in a circle smaller than the circle defining the circumference of the tire.

2. An annular tire case composed of material having at each edge a longitudinal pocket, a longitudinally elastic cord in each pocket to retain the pocketed edge of the case in a circle smaller than the circle defining the circumference of the tire.

3. An annular tire case composed of material having at each edge a longitudinal pocket, a longitudinally elastic metallic cord in each pocket to retain the pocketed edge of the case in a circle smaller than the circle defining the circumference of the tire.

4. An annular tire case composed of material having at each edge a longitudinal pocket, a coiled metallic spring constituting a longitudinally elastic cord in each pocket to retain the pocketed edge of the case in a circle smaller than the circle defining the circumference of the tire.

5. An annular tire case composed of material having at each edge a longitudinal pocket, a cord in each pocket to retain the pocketed edges of the case in a circle smaller than the circle defining the circumference of the tire, one of said cords being longitudinally elastic, whereby the annular pocketed edge containing the said cord may be expanded to position the same upon the tire, and when contracted will hold the said edge in position on the tire.

6. An annular tire case composed of material having at each edge a longitudinal pocket, a cord in each pocket to retain the pocketed edges of the case in a circle smaller than the circle defining the circumference of the tire, one of said cords being a longitudinally elastic metallic cord, whereby the annular pocketed edge containing the said cord may be expanded to position the same upon the tire, and when contracted will hold the said edge in position on the tire.

7. An annular tire case composed of material having at each edge a longitudinal pocket, a cord in each pocket to retain the pocketed edges of the case in a circle smaller than the circle defining the circumference of the tire, one of said cords being constituted of a coiled metallic spring, whereby the annular pocketed edge containing the said cord may be expanded to position the same upon the tire, and when contracted will hold the said edge in position on the tire.

8. A tire case provided at one edge with means by which, when the case is in position on the tire, the said edge is held in place against the tire, and provided at its other edge with a longitudinal pocket, a longitudinally elastic cord in said pocket by means of which, when the case is in position on the tire, the said edge is contracted into and retained in a circle smaller than the circle defining the circumference of the tire.

In testimony whereof, I have signed my name to this specification, in the presence of two subscribing witnesses.

ARTHUR H. KINDER.

Witnesses:
THOMAS J. DRUMMOND,
NATHAN HEARD.